3,410,850
4H-PYRAZINO-[2,3d][1,3]OXAZIN-4-ONES AND THEIR PREPARATION
Edward J. Cragoe, Jr., and John B. Bicking, Lansdale, Pa., assignors to Merck & Co., Inc., Rahway, N.J., a corporation of New Jersey
No Drawing. Continuation-in-part of application Ser. No. 357,256, Apr. 3, 1964. This application Nov. 22, 1965, Ser. No. 509,217
10 Claims. (Cl. 260—244)

ABSTRACT OF THE DISCLOSURE 4H-pyrazino-[2,3d][1,3]oxazin-4-one compounds optionally substituted in positions 2,6 and/or 7, especially useful in the synthesis of pyrazinoylguanidine or pyrazinamidoguanidine compounds, are prepared by reacting a lower alkanoic acid anhydride and a 3-aminopyrazinoic acid.

---

In accordance with this invention, it has been discovered that a 3-aminopyrazinoic acid (Compound I) reacts with an organic acid anhydride having the formula $$(R^5CO_2)O$$

to produce the corresponding 2-$R^5$-4H-pyrazino[2,3-d][1,3]oxazin-4-one (Compound II).

Compound II reacts with a guanidine to produce the corresponding (3-acylaminopyrazinoyl)guanidine (Compound III), which latter compound can be hydrolyzed to the (3-aminopyrazinoyl)guanidine (Compound IV). The guanidine reactant can be guanidine itself, or a substituted derivative thereof.

Compound II reacts with an aminoguanidine to produce the corresponding (3-acylaminopyrazinamido)guanidine (Compound V), which then can be hydrolyzed to the (3-aminopyrazinamido)guanidine (Compound VI).

These reactions are chemically represented as follows:

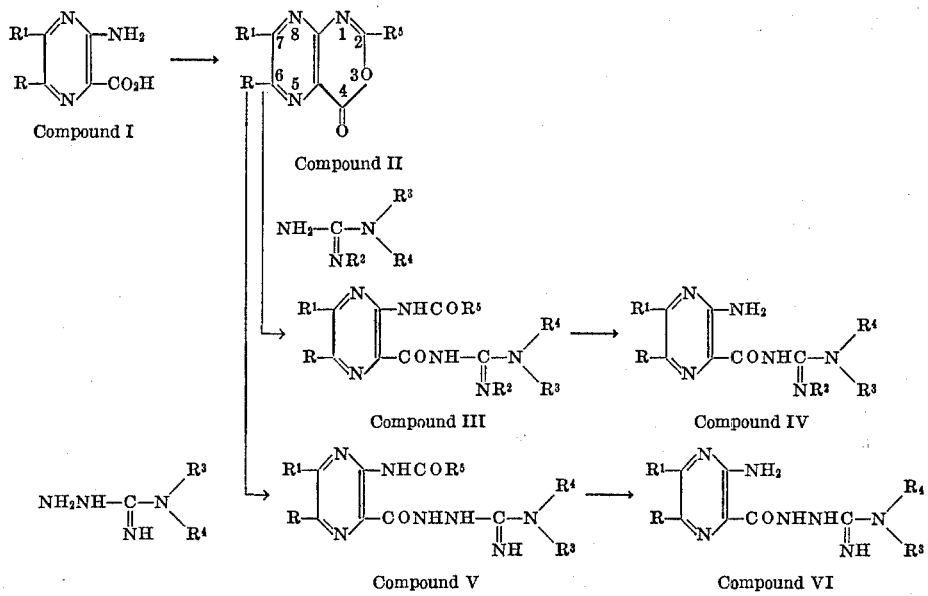

This application in a continuation-in-part of United States applications Ser. No. 357,256, filed Apr. 3, 1964, and Ser. No. 313,315, filed Oct. 7, 1963; also of Ser. No. 311,291, filed Sept. 27, 1963; and Ser. No. 234,213, filed Oct. 30, 1962 (now abandoned); also of Ser. No. 323,886, filed Nov. 15, 1963, and Ser. No. 332,901, filed Dec. 23, 1963.

This invention relates to a method for the preparation of pyrazinoylguanidines and pyrazinamidoguanidines which have a 3-amino- or a 3-acylamino-group attached to the pyrazine nucleus, and to novel intermediate compounds and methods used in the preparation of these useful saluretic products.

wherein

R represents (1) hydrogen, (2) halogen, (3) lower alkyl, (4) cycloalkyl having from 3 to 6 membered rings, (5) phenyl or substituted phenyl (where the substituent preferably is lower alkyl, halo and lower alkoxy), (6) phenyl-lower alkyl, (7) lower alkoxy, (8) lower alkylthio, (9) phenyl-lower alkylthio, (10) lower alkylsulfonyl, (11) phenyl-lower-alkylsulfonyl, (12) amino or mono or dialkylamino wherein the alkyls can be joined together to form a ring structure with the nitrogen to which they are attached (as the piperidyl group), and (13) phenyl-lower alkylamino;

R¹ represents (1) hydrogen, (2) halogen, (3) lower alkyl, (4) cycloalkyl having from 3 to 6 membered rings, (5) phenyl, substituted phenyl (where the substituent preferably is lower alkyl, halo and lower alkoxy) and (6) amino as the unsubstituted amino, acylamino, or mono- or dialkylamino;

R² is (1) hydrogen, (2) lower alkyl (especially having from 1–5 carbon atoms, as particularly, methyl but also ethyl through amyl and either branched or straight chained), (3) aryl (especially phenyl either unsubstituted or having one or more substituents selected from halogen, lower alkyl or lower alkoxy), (4) aralkyl (especially phenyl-lower-alkyl ($C_{1-3}$) the phenyl radical being unsubstituted or substituted with halogen, lower alkyl or lower alkoxy), R³ is (1) hydrogen, (2) lower alkyl ($C_{1-5}$) [either unsubstituted or substituted with hydroxy, amino or particularly a mono- or di-lower-alkylamino, wherein the alkyl groups may be linked to form a hetero structure with the amino-nitrogen to which they are attached such as to form an azacycloalkyl group, aryl especially phenyl either unsubstituted or substituted with halogen, lower alkyl or lower alkoxyl], (3) aryl especially phenyl either unsubstituted or substituted with halogen, lower alkyl or lower alkoxy, (4) acyl particularly having the structure R—CO— wherein R is lower alkyl ($C_{1-5}$), aryl, especially phenyl, aralkyl, especially phenyl-lower-alkyl ($C_{1-3}$) the phenyl radicals being unsubstituted or substituted with halogen, lower alkyl or lower alkoxy, (5) alkylidenamino or aralkylideneamino;

R⁴ is (1) hydrogen, (2) lower alkyl ($C_{1-5}$) or substituted lower alkyl;

R⁵ is (1) hydrogen or (2) lower-alkyl.

The designation of "halo" in this specification and claims includes bromo, chloro and iodo.

The products represented by Compounds III, IV, V and VI possess diuretic and natriuretic properties useful in the treatment of edema, hypertension and other diseases known to be responsive to this therapy.

The products represented by Compound II are useful intermediates in the preparation of Compounds III, IV, V, and VI, which possess the diuretic and natriuretic properties useful in the treatment of edema, hypertension and other diseases known to be responsive to this therapy. Examples 13–25 illustrate typical procedures for the conversion of the novel 4H-pyrazino[2,3-d][1,3]oxazin-4-one compounds of this invention into useful diuretic compounds.

The method of this invention is particularly useful for preparing compounds which have a 3-acylamino substituent (—NHCOR⁵) attached to the pyrazine nucleus, as shown in Compounds III and V, since these products are difficultly accessible by other routes. This method is also useful for preparing compounds which bear an acyl substituent in the guanidine moiety (i.e. as an acyl group represented by R³ in the Compounds III and IV). In addition, this method is useful for preparing compounds of type III and IV where the substituents in the guanidine moiety render the guanidine intermediate less basic, for example, compounds where both R² and R³ are aryl, especially phenyl.

The reaction of the 3-aminopyrazinoic acid (Compound I) with an organic acid anhydride (R⁵CO)₂O is preferably carried out at a temperature within the range of about 70–130° C., and most conveniently at the reflux temperature of the reaction mixture. The reaction is usually complete in from one to four hours. An excess of the organic acid anhydride is used. The amount varies from four to about ten moles (preferably about 7 moles) of the acid anhydride per mole of the 3-aminopyrazinoic acid. The product crystallizes from the reaction mixture and can be recovered by filtration.

Typical of the anhydrides which can be used are acetic anhydride, propionic anhydride and butyric anhydride. Compounds of type II where R⁵ represents hydrogen are obtained by utilizing a mixture of formic acid and acetic anhydride, preferably in the proportions of about 1:1 by volume.

The 4H-pyrazino-[2,3-d][1,3]oxazin-4-one (Compound II) reacts with a guanidine or an aminoguanidine to form the corresponding (3 - acylaminopyrazinoyl)guanidine (Compound III), or the (3-acylaminopyrazinamido) guanidine (Compound V) respectively. These products will be recognized as the compounds of this invention having an acyl radical attached to the 3-amino-group in the pyrazine nucleus.

This reaction takes place in an anhydrous solvent in an inert atmosphere under basic conditions. Details of the actual reaction conditions for the preparation of these compounds are provided in Examples 13 through 25. In a typical procedure, the guanidine or aminoguanidine salt (preferably the hydrochloride) is added to a sodium alcoholate, prepared in situ by adding sodium metal to an alkanol, such as ethanol or 2-propanol. The sodium salt which precipitates then is filtered off.

The 4H-pyrazino [2,3-d][1,3]oxazin-4-one, which is previously dissolved in a solvent such as ethyl acetate or an alcohol, is added to the guanidine solution. The reaction temperature is preferably maintained low, a range of about 10° to about 40° C. proving particularly effective. Temperatures up to the reflux temperature of the mixture are sometimes employed. The reaction is usually complete in less than 30 minutes although it may be continued for 1 to 3 hours. The product crystallizes from the reaction mixture and can be further purified by recrystallization.

The (3-acylaminopyrazinoyl)guanidines (III) and the (3-acylaminopyrazinamido)guanidines (V) are readily hydrolyzed to the corresponding 3-amino-derivatives by treating with a dilute strong acid such as hydrochloric, sulfuric, phosphoric or methanesulfonic acid and the like. The reaction proceeds favorably at room temperature with a convenient temperature range of about 20° to about 40° C. The reaction is complete in one to four hours. The product is recovered by filtering the reaction mixture and making the mixture basic, as for example by the addition of an alkali metal hydroxide which causes the product to precipitate.

Certain of the 3-aminopyrazinoic acids (I) used as starting materials can be prepared from the corresponding alkyl 3-aminopyrazinoate by treating with a dilute basic solution such as an alkali metal hydroxide. This reaction is carried out at a temperature of about 60° C. to about 100° C. for one to two hours. The 3-aminopyrazinoic acid is isolated by acidifying the mixture.

The 3-aminopyrazinoic acids having a hydrocarbon group in the 6-position can be prepared from the corresponding 6-substituted-3-aminopyrazinamides by heating on a steam bath with 10% sodium hydroxide solution to form the sodium salt of the 6-substituted-3-aminopyrazinoic acid. The salt is dissolved in hot water and the solution acidified with hydrochloric acid to form the corresponding 3-aminopyrazinoic acid.

The preparation of the various 3-aminopyrazinoate esters and 3-aminopyrazinamides is described in Belgian Patent 623,480, issued Apr. 11, 1963, and also in co-pending United States applications, Ser. Nos. 311,291, filed Sept. 27, 1963, and 313,315, filed Oct. 7, 1963, the disclosures of which are incorporated herein by reference.

The intermediate pyrazinoic acids required in the synthesis of the 6—R¹⁰O—, 6—R⁹S—, 6—R⁹SO₂—, and

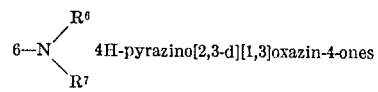

(Compound II) are prepared as follows:

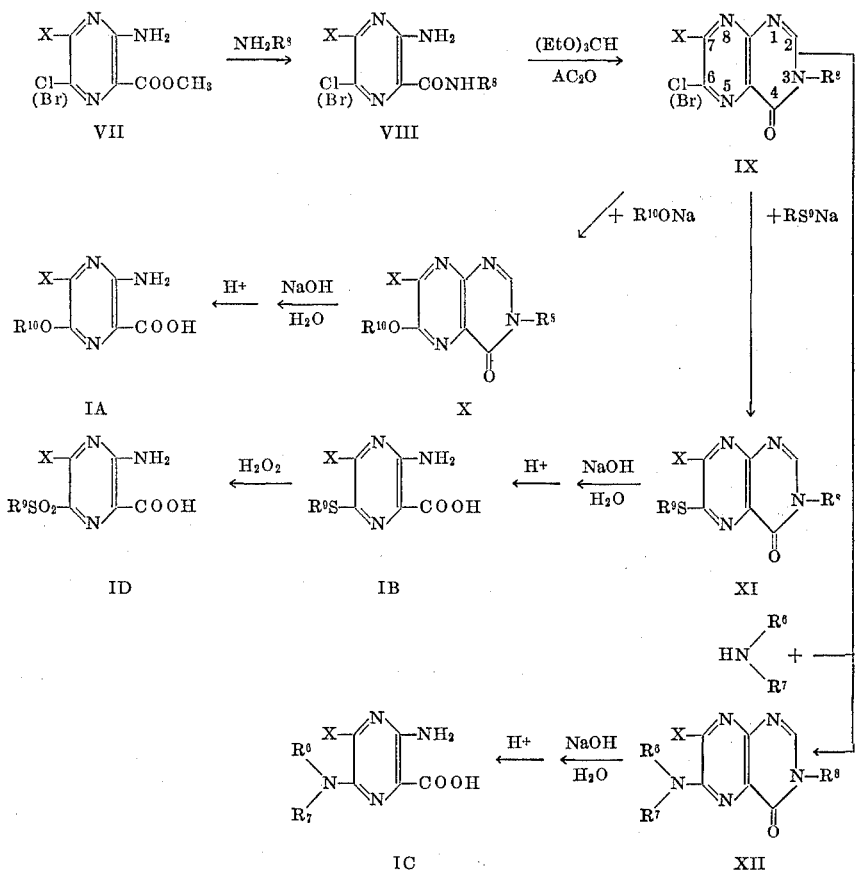

where X is hydrogen, chloro, aryl especially phenyl, and lower alkyl, $R^8$ is hydrogen or lower alkyl, $R^6$ and $R^7$ separately are hydrogen, lower alkyl, phenyl-lower-alkyl or joined together they can form the cyclic structure

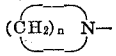

where n is the numeral 4 or 5 and preferably the piperidyl group; $R^9$ is selected from lower-alkyl and phenyl-lower-alkyl; and $R^{10}$ is a lower alkyl.

The pteridiones and the pyrazinoic acids of this invention are prepared by the following novel sequence of reactions.

The pyrazinoic acid ester (VII) upon treatment with ammonia or an amine at room temperature or more advantageously at temperatures ranging between about 80 to 150° C. with or without a solvent, such as water, a lower alkanol, or dimethylformamide gives the pyrazinamide (VIII).

The treatment of VIII with acetic anhydride and triethyl orthoformate yields the corresponding 6-chloro(or bromo)-4(3H)-pteridinone (IX). This reaction preferably is carried out at a temperature ranging from between about 50° C. to the reflux temperature of the reaction mixture. A large excess of triethyl orthoformate and acetic anhydride advantageously is employed to serve as solvent as well as reactant.

The reaction of Compound IX with nucleophiles, such as (1) alkali metal salts of lower alkanols or (2) alkali metal salts of alkyl or aralkyl mercaptans or (3) with amines such as ammonia, mono- or di- lower alkyl or aralkyl-lower alkyl amines, produces the 6-substituted-4(3H)-pteridinones X, XI, XII respectively.

The 6-lower alkoxy products (X) are prepared by refluxing the 6 - chloro(or bromo) - 4(3H) - pteridinone (IX) with a solution of an alkali metal salt of a lower alkanol prepared by the reaction of an alkali metal such as sodium, potassium or lithium with a lower alkanol. The reaction generally is completed in between about one to six hours.

For the synthesis of the 6 - $R^9$S - 4(3H) - pteridinones (XI), a lower alkyl mercaptan or aralkyl mercaptan is dissolved in an aqueous solution of an alkali metal hydroxide such as a 10% sodium hydroxide solution, and then the 6-chloro(or bromo)-4(3H)-pteridinone (IX) is added and the reaction mixture heated at between about 60 to 120° C. for about 20 minutes to 4 hours. The product then is isolated by acidification of the reaction mixture.

The 6 - amino - 4(3H) - pteridinones (XII) advantageously are synthesized by heating a 6-chloro (or bromo)- 4(3H) - pteridinone (IX) with liquid ammonia or an amine (HN$R^6R^7$), in a solvent, advantageously water or a lower alkanol such as ethanol, 2-methoxyethanol and the like. The reaction can be conducted at temperatures ranging from about ambient temperature to about 150° C. for periods of 30 minutes to 6 hours and the product isolated by evaporation of the solvent.

The 6-substituted-4(3H)-pteridinones, X, XI, XII, can be converted to the 3-amino-6-substituted-pyrazinoic acids by heating at temperatures between about 50 to 125° C. with aqueous alkali metal hydroxides advantageously with sodium, potassium or lithium hydroxide, in concentrations ranging between about 1 to 20% for periods of 30 minutes to 8 hours. The product then can be isolated by cooling the reaction mixture and acidifying with a mineral acid such as hydrochloric acid.

The 3-amino - 6 - (alkyl or aralkylsulfonyl)pyrazinoic acids (ID) are prepared by the oxidation of the required 6-(alkyl or aralkylmercapto)pyrazinoic acids (IB). Various oxidizing agents can be employed such as hydrogen peroxide in acetic acid or potassium permanganate in aqueous sodium hydroxide solution. When potassium permanganate is employed, the product is isolated by filtering the reaction mixture and acidifying the filtrate.

The following examples are illustrative of the method by which the products of this invention can be prepared and are not to be considered as limiting the invention to the particular procedural conditions employed or to the particular compounds prepared thereby.

Example 1.—2-methyl-6-chloro-4H-pyrazino [2,3-d][1,3]oxozin-4-one

Step A: Preparation of methyl 3-amino-6-chloropyrazinoate.—A 5-liter, 3-necked flask equipped with a mechanical stirrer, thermometer and gas inlet tube is charged with a warm (about 38° C.) mixture of water (3180 ml.) and glacial acetic acid (750 ml.); methyl 3-aminopyrazinoate (90 g., 0.588 mole) then is added. The stirrer is started and the mixture is heated to 41° C. which causes nearly all the ester to dissolve. The solution then is cooled to just below 40° C. using an ice bath. With vigorous stirring, chlorine (about 140 g.) is passed through the solution over a period of 25 minutes. A precipitate begins to form after five minutes and becomes quite voluminous by the end of the reaction. The nearly white precipitate, which is methyl 3-chloroamino-6-chloropyrazinoate, is removed by filtration and washed with a small amount of ice water. A small amount of this material, when recrystallized from warm acetic acid, melts at 142° C. (dec.).

Analysis.—Calculated for $C_6H_5Cl_2N_3O_2$: C, 32.46; H, 2.27; N, 18.93; Cl (total), 31.94; Cl (active), 15.97. Found: C, 32.82; H, 2.34; N, 18.90; Cl (total), 32.09; Cl (active), 16.06.

The moist methyl 3-chloroamino-6-chloropyrazinoate and a solution of sodium bisulfite (150 g.) in water (900 ml.) are placed in a 4-liter beaker and stirred mechanically for one-half hour. The temperature of the mixture is maintained at 25° C. by addition of ice. The light yellow methyl 3-amino-6-chloropyrazinoate is removed by filtration, suspended in 150 ml. of ice water and filtered. This process is repeated twice with 150 ml. portions of ice water and once with a 50 ml. portion of cold isopropyl alcohol. After drying in the air, there is obtained 60 g. (55%) of methyl 3-amino-6-chloropyrazinoate, M.P. 159–161° C.

Analysis.—Calculated for $C_6H_6ClN_3O_2$: C, 38.42; H, 3.22; N, 22.40; Cl, 18.90. Found: C, 38.81; H, 3.54; N, 22.83; Cl, 18.39.

Step B: Preparation of 3-amino-6-chloropyrazinoic acid.—Methyl 3-amino-6-chloropyrazinoate (150 g., 0.8 mole) is added to a 2.5 N sodium hydroxide solution (800 ml.) and the mixture is stirred and heated for 1.5 hours on the steam bath. The resulting suspension of the sodium salt of the pyrazinoic acid is cooled, and collected on a filter. The salt then is dissolved in boiling water (2400 ml.) and the solution is filtered and acidified with concentrated hydrochloric acid. The mixture is cooled and the precipitated product is collected, washed with water, and dried in an oven at 70° C. to give 127 g. (92%) of 3-amino-6-chloropyrazinoic acid, M.P. 172–174° C. (dec.). After recrystallizing from ethanol, the product melts at 178.5–179.5° C.

Analysis.—Calculated for $C_5H_4ClN_3O_2$: C, 34.60; H, 2.32; N, 23.66. Found: C, 34.93; H, 2.55; N, 24.21.

Step C: Preparation of 2-methyl-6-chloro-4H-pyrazino [2,3-d]-[1,3]oxazin - 4 - one.—3 - amino-6-chloropyrazinoic acid (127 g., 0.73 mole) and acetric anhydride (550 ml.) are stirred and heated for one hour on a steam bath. The resulting solution is chilled and the product, which crystallizes, is collected on a filter. The solid is triturated with 200 cc. of ethyl acetate, collected on a filter and dried to constant weight in vacuum desiccator, yielding 97 g. (67%) of 2-methyl-6-chloro-4H-pyrazino[2,3-d][1,3]oxazin-4-one, M.P. 155-158° C. (dec.). After recrystallization from ethyl acetate, the M.P. is 158–160° C. (dec.).

Analysis.—Calculated for $C_7H_4ClN_3O_2$: C, 42.55; H, 2.04; N, 21.27. Found: C, 42.59; H, 2.14; N, 21.19.

By replacing the 3-amino-6-chloropyrazinoic acid used in Example 1, Step C by equimolecular quantities of 3,6-diaminopyrazinoic acid,
3-amino-6-cyclohexylpyrazinoic acid,
3-amino-6-cyclopentylpyrazinoic acid,
3-amino-6-(p-chlorophenyl)pyrazinoic acid,
3-amino-5-cyclohexylpyrazinoic acid, and then following substantially the same procedure described in Step C of Example 1, there is obtained, respectively:

2-methyl-6-amino-4H-pyrazino[2,3-d][1,3]oxazin-4-one
2-methyl-6-cyclohexyl-4H-pyrazino[2,3-d][1,3]-oxazin-4-one
2-methyl-6-cyclopentyl-4H-pyrazino[2,3-d][1,3]oxazin-4-one
2-methyl-6-(p-chlorophenyl)-4H-pyrazino[2,3-d][1,3] oxazin-4-one, and
2-methyl-7-cyclohexyl-4H-pyrazino[2,3-d][1,3]oxazin-4-one Similarly, by replacing the methyl 3-amino-6-chloropyrazinoate employed in Step B of Example 1 by equimolecular quantities of methyl 3-amino-5,6-dichloropyrazinoate,
methyl 3-amino-5-phenyl-6-bromopyrazinoate,
methyl 3-amino-5-di-methylamino-6-chloropyrazinoate,
methyl 3-amino-5-methylethylamino-6-chloropyrazinoate, and
methyl 3-amino-5-isopropylamino-6-chloropyrazinoate, and then following substantially the same procedures described in Steps B and C of Example 1, there is obtained successively the correpsonding pyrazinoic acids and then the corresponding oxazine respectively:

2-methyl-6,7-dichloro-4H-pyrazino[2,3-d][1,3]oxazin-4-one
2-methyl-6-bromo-7-phenyl-4H-pyrazino[2,3-d][1,3] oxazin-4-one
2-methyl-6-chloro-7-di-methyl-4H-pyrazino [2,3-d]-[1,3]oxazin-4-one
2-methyl-6-chloro-7-methylethylamino-4H-pyrazino [2,3-d]-[1,3[oxazin-4-one
2-methyl-6-chloro-7-isopropylamino-4H-pyrazino [2,3]-[1,3]oxazin-4-one Example 2.—2-methyl-6-chloro-7-acetamido-4H-pyrazino-[2,3-d][1,3]oxazin-4-one Step A: Preparation of methyl 3-amino-5,6-dichloropyrazinoate.—Methyl 3-aminopyrazinoate (765 g., 5 moles) is suspended in 5 liters of dry benzene. While stirring under anhydrous conditions sulfuryl chloride (1.99 liters, 3318 g., 24.58 moles) is added over a period of 30 minutes and stirring is continued for 1 hour. During this period, the temperature rises to about 50° C. and then begins to drop. The mixture is heated cautiously to reflux (60° C.), refluxed for 5 hours and then stirred over night at room temperature. The excess sulfuryl chloride is distilled off at atmospheric pressure (distillation is stopped when vapor temperature reaches 78° C.). The dark red mixture is chilled to 6° C. The crystals are filtered off, washed by displacement with two 100 ml. portions of cold (8° C.) benzene, then washed with 300 ml. petroleum ether and dried in vacuo at room temperature, yielding 888 g. (80%) of methyl 3-amino-5,6-dichloropyrazinoate in the form of red crystals M.P. 228–230° C. The crude product is dissolved in 56 liters of boiling acetonitrile and passed through a heated (70–

80° C.) column of decolorizing charcoal (444 g.). The column is washed with 25 liters of hot acetonitrile, the combined eluate concentrated in vacuo to about 6 liters and chilled to 5° C. The crystals that form are filtered, washed three times with cold acetonitrile, and air dried to constant weight, yielding 724 g. (82% recovery, 66% overall) of methyl 3-amino-5,6-dichloro-pyrazinoate in the form of yellow crystals, M.P. 230–234° C. After additional recrystallizations from acetonitrile the product melts at 233–234° C.

*Analysis.*—Calculated for $C_6H_5Cl_2N_3O_2$: C, 32.46; H, 2.27; N, 18.93; Cl, 31.94. Found: C, 32.83; H, 2.35; N, 19.12; Cl, 31.94.

Step B: Preparation of methyl 3,5-diamino-6-chloropyrazinoate.—In a 2-liter, 3-necked flask fitted with a mechanical stirrer, thermometer and gas inlet tube is placed dry dimethyl sulfoxide (1 liter). Methyl 3-amino-5,6-dichloropyrazinoate (100 g., 0.45 mole) is added and the mixture stirred and heated at 65° C. on a steam bath until solution is effected. A stream of dry ammonia gas is admitted to the solution, with continuous stirring, over a period of 45 minutes while the temperature is maintained at 65–70° C. The solution is cooled to about 10° C. with continuous stirring and ammonia gas is admitted for an additional 1¼ hours. The yellow reaction mixture is poured, with stirring, into cold water (2 liters) and the light yellow solid that separates is removed by filtration, thoroughly washed with water, and dried in a vacuum desiccator to give 82.5 g. (91%) of methyl 3,5-diamino-6-chloropyrazinoate, M.P. 210–212° C. Recrystallization from acetonitrile gives material melting at 212–213° C.

*Analysis.*—Calculated for $C_6H_7ClN_4O_2$: C, 35.57; H, 3.48; N, 27.65. Found: C, 35.80; N, 3.38; N, 28.01.

Step C: Preparation of 3,5-diamino-6-chloropyrazinoic acid.—Methyl 3,5-diamino-6-chloropyrazinoate (101 g., 0.5 mole) is added to 600 cc. of 10% sodium hydroxide solution, and the mixture is stirred and heated on the steam bath for 4 hours. The resulting solution is cooled and acidified with concentrated hydrochloric acid to yield 84 g. (89%) of 3,5-diamino-6-chloropyrazinoic acid, M.P. 228–230° C. (dec.).

Step D: Preparation of 2-methyl-6-chloro-7-acetamido-4H-pyrazino[2,3-d][1,3]oxazin-4-one.—A solution of 3,5-diamino-6-chloropyrazinoic acid (1.89 g., 0.01 mole) in 50 ml. of acetic anhydride is refluxed for 45 minutes. The solution is then cooled, and the crystalline product which separates is recrystallized from acetic anhydride to obtain 0.8 g. of 2-methyl-6-chloro-7-acetamido-4H-pyrazino[2,3-d][1,3]oxazine-4-one, M.P. 200–204° C.

*Analysis.*—Calculated for $C_9H_7ClN_4O_3$: C, 42.45; H, 2.77; N, 22.00. Found: C, 42.60; H, 3.14; N, 21.57.

By replacing the acetic anhydride used in Step D of Example 2 by an equal quantity of butyric anhydride and then raising the temperature of the suspension to 150° C. over a period of 30 minutes to effect solution, and continue heating at this temperature for an additional hour, employing good stirring, an orange-red reaction solution is obtained. The reaction solution then is chilled in an ice bath, the solid material is collected by filtration and washed with ether to give 52.7% of product melting at 166–167° C. After recrystallization from carbon tetrachloride and then from butyl chloride, 6 g. of 2-propyl-6-chloro-7-butyramido-4-H-pyrazino[2,3-d][1,3]oxazin-4-one is obtained, M.P. 169–170° C.

*Analysis.*—Calculated for $C_{13}H_{15}ClN_4O_3$: C, 50.25; H, 4.87; N, 18.03. Found: C, 50.13; H, 4.78; N, 18.21.

Example 3.—2-methyl-6-chloro-7-amino-4H-pyrazino-[2,3-d][1,3]oxazin-4-one

A mixture of 3,5-diamino-6-chloropyrazinoic acid (45.5 g., 0.22 mole) from Example 2 and 100 ml. of acetic anhydride is stirred and heated at reflux for one hour. The mixture is cooled to 50° C. and the solid collected to obtain 37 g. of 2-methyl-6-chloro-7-amino-4H-pyrazino[2,3-d][1,3]oxazin-4-one, M.P. 280° C. (dec.).

*Analysis.*—Calculated for $C_7H_5ClN_4O_2$: C, 39.54; H, 2.37; N, 26.36. Found: C, 40.08; H, 2.65; N, 26.13.

Example 4.—2-methyl-6-methylmercapto-4H-pyrazino-[2,3-d][1,3]oxazin-4-one

Step A: Preparation of 3-amino-6-chloropyrazinamide.—Methyl 3-amino-6-chloropyrazinoate (300 g., 1.6 mole) is added to 2 liters of concentrated ammonium hydroxide solution and the mixture is stirred 16 hours at room temperature. The solid product formed is collected by filtration and dried, yielding 260 g., of 3-amino-6-chloropyrazinamide, M.P. 227–230° C.

Step B: Preparation of 6-chloro-4(3H)-pteridinone.—A mixture of 3-amino-6-chloropyrazinamide (33 g., 0.19 mole), acetic anhydride (200 ml.) and triethylorthoformate (200 ml.) is refluxed for 1.5 hours at about 130° C. The mixture is cooled and the product which precipitates is collected and recrystallized from aqueous 2-propanol; the yield is 20 g. of 6-chloro-4(3H)-pteridinone, M.P. 268–270° C. (dec.).

*Analysis.*—Calculated for $C_6H_3ClN_4O$: C, 39.47; H, 1.65; N, 30.69. Found: C, 39.61; H, 1.87; N, 31.23.

Step C: Preparation of 6-methylmercapto-4(3H)-pteridinone.—Methyl mercaptan (4.8 g., 0.1 mole) is dissolved in a 10% sodium hydroxide solution (60 ml.), and added to a solution of 6-chloro-4(3H)-pteridinone (9.1 g., 0.05 mole) in a 4% sodium hydroxide solution (100 ml.). The resulting solution is heated 20 minutes on the steam bath, and then chilled to precipitate the sodium salt of the product. The salt is collected, dissolved in hot water and the solution acidified to precipitate the product which is recrystallized from aqueous 2-propanol to yield 3.5 g. of 6-methylmercapto-4(3H)-pteridinone, M.P. 289.5–291.5° C.

Step D: Preparation of 3-amino-6-methylmercaptopyrazinoic acid.—A solution of 6-methylmercapto-4(3H)-pteridinone (25.5 g., 0.13 mole) in 5% sodium hydroxide solution (250 ml.) is heated 13 hours on the steam bath, and then chilled to precipitate the sodium salt of the product. The salt is collected, dissolved in hot water and the solution acidified to precipitate the product which is crystallized from ethyl acetate to yield 7.1 g. of 3-amino-6-methylmercaptopyrazinoic acid, M.P. 182–184° C. (dec.).

*Analysis.*—Calculated for $C_6H_7N_3O_2S$: C, 38.91; H, 3.81. Found: C, 39.58; H, 3.98.

Step E: Preparation of 2-methyl-6-methylmercapto-4H-pyrazino[2,3-d][1,3]oxazin-4-one.—A solution of 3-amino-6-methylmercaptopyrazinoic acid (3.0 g., 0.016 mole) in acetic anhydride (15 ml.) is heated 2 hours on the steam bath, and then cooled. The product which separates is recrystallized from benzene to yield 2.5 g. of 2 - methyl - 6 - methylmercapto - 4H - pyrazino[2,3-d][1,3]oxazin-4-one, M.P. 189–191° C.

*Analysis.*—Calculated for $C_8H_7N_3O_2S$: C, 45.92; H, 3.37; N, 20.08. Found: C, 46.11; H, 3.42; N, 20.04.

By replacing the methyl 3-amino-6-chloropyrazinoate used in Step A of Example 4 by an equimolecular quantity of methyl 3-amino-5-phenyl-6-bromopyrazinoate and then following substantially the same procedures described in Steps A through E of Example 4, there are obtained, successively:

3-amino-5-phenyl-6-bromopyrazinamide,
6-bromo-7-phenyl-4(3H)-pteridinone,
6-methylmercapto-7-phenyl-4(3H)-pteridinone,
3-amino-5-phenyl-6-methylmercaptopyrazinoic acid, and
2 - methyl - 6 - methylmercapto - 7 - phenyl - 4H - pyrazino[2,3-d][1,3]oxazin-4-one Similarly, by replacing the methyl 3-amino-6-chloropyrazinoate used in Step A of Example 4 by an equimolecular quantity of methyl 3-amnio-5-methyl-6-bromopyrazinoate and then following substantially the same procedures described in Steps A through E of Example 4, there are obtained successively:

3-amino-5-methyl-6-bromopyrazinamide,
6-bromo-7-methyl-4(3H)-pteridinone,
6-methylmercapto-7-methyl-4(3H)-pteridinone,
3-amino-5-methyl-6-methylmercaptopyrazinoic acid, and
2,7 - dimethyl - 6 - methylmercapto - 4H - pyrazino[2,3-d][1,3]oxazin-4-one.

Example 5.—2-methyl-6-methylsulfonyl-4H-pyrazino-[2,3-d][1,3]oxazin-4-one

Step A: Preparation of 3-amino-6-methylsulfonylpyrazinoic acid.—A solution of potassium permanganate (1.05 g., 0.0067 mole) in water (35 ml.) is added to a solution of 3-amino-6-methylmercaptopyrazinoic acid, from Example 4, Step D (0.92 g., 0.005 mole) in a 2.5% sodium hydroxide solution (15 ml.). Manganese dioxide is filtered off and the filtrate acidified to precipitate the product which is recrystallized from 2-propanol to yield 0.5 g., of 3-amino-6-methylsulfonylpyrazinoic acid, M.P. 239–242° C. (dec.).

*Analysis.*—Calculated for $C_6H_7N_3O_4S$: C, 33.18; H, 3.25; N, 19.35. Found: C, 33.81; H, 3.35; N, 18.88.

Step B: Preparation of 2-methyl-6-methylsulfonyl-4H-pyrazino[2,3-d][1,3]oxazin-4-one. — A solution of 3-amino-6-methylsulfonylpyrazinoic acid (2.2 g., 0.01 mole) in acetic anhydride (25 ml.) is heated 5 hours on the steam bath, cooled and the precipitated product recrystallized from acetone to obtain 0.8 g. of 2-methyl-6-methylsulfonyl - 4H - pyrazino[2,3-d][1,3]oxazin - 4-one, M.P. 214–216° C.

*Analysis.*—Calculated for $C_8H_7N_3O_4S$: C, 39.83; H, 2.93; N, 17.42. Found: C, 40.23; H, 2.92; N, 17.27.

Example 6.—3-methyl-6-benzylmercapto-4H-pyrazino-[2,3-d][1,3]oxazin-4-one

Step A: Preparation of 6 - benzylmercapto - 4(3H)-pteridinone.—A solution of 6-chloro-4(3H)-pteridinone from Example 4, Step B (5.5 g., 0.03 mole) and benzyl mercaptan (4.4 g., 0.035 mole) in 4% sodium hydroxide solution (100 ml.) is heated 30 minutes on the steam bath. The solution is cooled and 40% sodium hydroxide solution (20 ml.) is added to precipitate the sodium salt of the product. The salt is collected, dissolved in 250 ml. of hot water, and the solution is acidified to precipitate the product which is recrystallized from aqueous 2-propanol to yield 5.5 g. of 6 - benzylmercapto - 4(3H)-pteridinone, M.P. 233–235° C.

*Analysis.*—Calculated for $C_{13}H_{10}N_4OS$: C, 57.76; H, 3.73; N, 20.73. Found: C, 57.79; H, 3.95; N, 20.59.

Step B: Preparation of 3-amino - 6 - benzylmercaptopyrazinoic acid.—A solution of 6-benzylmercapto-4(3H)-pteridinone (42.2 g., 0.156 mole) in 5% sodium hydroxide solution (600 ml.) is heated 8 hours on the steam bath. The solution is chilled to precipitate the sodium salt of the product. The salt is dissolved in hot water and the solution is acidified to precipitate 23 g. of 3-amino-6-benzylmercaptopyrazinoic acid, M.P. 136–139° C. After an additional recrystallization from ethyl acetate the product melts at 138–139° C.

*Analysis.*—Calculated for $C_{12}H_{11}N_3O_2S$: C, 55.16; H, 4.24; N, 16.08. Found: C, 54.75; H, 4.10; N, 15.96.

Step C: Preparation of 2 - methyl - 6 - benzylmercapto-4H-pyrazino[2,3-d][1,3]oxazine-4-one.—A solution of 3-amino - 6 - benzylmercaptopyrazinoic acid (8.5 g., 0.0325 mole) in acetic anhydride (50 ml.) is heated 5 hours on the steam bath. Volatile materials are distilled in vacuo and the residue is recrystallized from benzene to give 6.6 g., of 2 - methyl-6-benzylmercapto-4H-pyrazino[2,3-d][1,3]oxazin-4-one, M.P. 116.5–118.5° C.

*Analysis.*—Calculated for $C_{14}H_{11}N_3O_2S$: C, 58.93; H, 3.89; N, 14.73. Found: C, 58.99; H, 3.93; N, 14.68.

By replacing the 3-amino-6-methylmercaptopyrazinoic acid used in Step A of Example 5 by an equimolecular quantity of 3-amino-6-benzylmercaptopyrazinoic acid (from Example 6, Step B), and then following substantially the same procedures described in Steps A and B of Example 5, there is obtained successively:

3-amino-6-benzylsulfonylpyrazinoic acid and
2-methyl-6-benzylsulfonyl-4H-pyrazino[2,3-d][1,3]oxazin-4-one When in Example 6, Step A, the 6 - chloro - 4(3H)-pteridinone is replaced by an equimolecular quantity of 6-bromo-7-phenyl-4(3H)-pteridinone and the product subjected to the procedures described in Steps A through C of Example 6, there are formed successively:

6-benzylmercapto-7-phenyl-4(3H)-pteridinone,
3-amino-5-phenyl-6-benzylmercaptopyrazinoic acid and then
2-methyl-6-benzylmercapto-7-phenyl-4H-pyrazino[2,3-d]-[1,3]oxazin-4-one.

Similarly by replacing the 6-chloro-4(3H)-pteridinone used in Step A of Example 6 by an equimolecular quantity of 6-bromo-7-methyl-4(3H)-pteridinone and this product subjected to the procedures described in Steps A through C of Example 6, there are formed successively:

6-benzylmercapto-7-methyl-4(3H)-pteridinone,
3-amino-5-methyl-6-benzylmercaptopyrazinoic acid and then
2,7-dimethyl-6-benzylmercapto-4H-pyrazino[2,3-d][1,3]-oxazin-4-one.

The 3-amino - 5 - phenyl - 6 - benzylmercaptopyrazinoic acid and the 3-amino-5-methyl-6-benzylmercaptopyrazinoic acid obtained as described above when oxidized by substantially the same method described in Example 5, Step A, are converted respectively to:

3-amino-5-phenyl-6-benzylsulfonylpyrazoic acid and
3-amino-5-methyl-6-benzylsulfonylpyrazinoic acid.

When these acids are separately substituted on an equimolecular basis for the 3 - amino - 6 - methylsulfonylpyrazinoic acid used in Step B of Example 5, and then heated with acetic anhydride as described in Step B of Example 5 there is obtained, respectively:

2-methyl-6-benzylsulfonyl-7-phenyl-4(H)-pyrazino[2,3-d][1,3]oxazin-4-one and
2,7-dimethyl-6-benzylsulfonyl-4(H)-pyrazino[2,3-d][1,3]oxazin-4-one.

Example 7.—2-methyl-6-methoxy-4H-pyrazino[2,3-d][1,3]oxazin-4-one

Step A: Preparation of 3 - methyl - 6 - methoxy-4(3H)-pteridinone.—Sodium (1.2 g. 0.052 g. atom) is dissolved in methanol (100 ml.), 3 - methyl - 6 - chloro - 4(3H)-pteridinone (the preparation of which will be described in Example 12, Step B) (0.02 mole) is added and the solution is refluxed for four hours. After cooling, water (100 ml.) is added and the solution then is acidified with hydrochloric acid. The solid that separates is removed by filtration and recrystallized from ethanol to give a 98% yield of product, M.P. 232–234° C.

*Analysis.*—Calculated for $C_8H_8N_4O_2$: C, 50.00; H, 4.20; N, 29.16. Found: C, 50.53; H, 4.47; N, 29.04.

Step B: Preparation of 2-methyl - 6 - methoxy - 4H-pyrazino[2,3-d][1,3]oxazin-4-one.—By replacing the 6-methylmercapto-4(3H)-pteridinone employed in Step D of Example 4 by an equimolecular quantity of 3-methyl-6-methoxy-4(3H)-pteridinone and reacting it with sodium hydroxide by substantially the same procedure there described, the sodium salt of 3-amino-6-methoxypyrazinoic acid is obtained. This product then is substituted, in an equimolecular quantity, for the 3 - amino-6-methylmercaptopyrazinoic acid used in Step E of Example 4, and following essentially the same procedure there is obtained a 52% yield of 2-methyl-6-methoxy-4H-pyrazino[2,3-d][1,3]oxazin-4-one which, after recrystallization from benzene melts at 190–192° C.

*Analysis.*—Calculated for $C_8H_7N_3O_3$: C, 49.74; H, 3.65; N, 21.75. Found: C, 49.79; H, 3.52; N, 21.81.

By replacing the 3-methyl-6-chloro-4(3H)-pteridinone used in Step A of Example 7 by an equimolecular quantity of 6-chloro-4(3H)-pteridinone from Example 4, Step B, and following substantially the same procedure described in Example 7, Step A, there is obtained a 54% yield of 6-methoxy-4(3H)-pteridinone which, after recrystallization from ethanol, melts at 283–286° C.

*Analysis.*—Calculated for $C_7H_6N_4O_2$: C, 47.19; H, 3.39; N, 31.45. Found: C, 47.58; H, 3.76; N, 31.77.

Example 8.—2,7-dimethyl-4H-pyrazino[2,3-d][1,3] oxazin-4-one

This compound is prepared by essentially the same method described in Example 1, Step C, except that the 3-amino-6-chloropyrazinoic acid of Example 1, Step C, is replaced by an equimolecular quantity of 3 - amino-5-methylpyrazinoic acid.

Example 9.—2,6 - dimethyl - 4H - pyrazino[2,3-d][1,3] oxazin-4-one

Step A: Preparation of 3-amino-6-methylpyrazinoic acid.—A mixture of 3-amino-6-methylpyrazinamide (31 g., 0.20 mole) and 10% sodium hydroxide solution (320 ml.) is stirred and heated on a steam bath for 30 minutes whereupon a clear solution is obtained. The solution is chilled and the sodium salt of 3-amino-6-methylpyrazinoic acid which precipitates is collected on a filter. The salt then is dissolved in boiling water and the solution is filtered and acidified with concentrated hydrochloric acid. The mixture is cooled and the precipitated product is collected, washed with water, and dried in an oven at 70° C. to give 3-amino-6-methylpyrazinoic acid, M.P. 172–174° C. (dec.).

Step B: Preparation of 2,6-dimethyl-4H-pyrazino[2,3-d]-[1,3]oxazin-4-one.—This compound is prepared by essentially the same method described in Example 1, Step C, except that the 3-amino-6-chloropyrazinoic acid of Example 1, Step C, is replaced by an equimolecular quantity of 3-amino-6-methylpyrazinoic acid.

Example 10.—2 - methyl - 6-phenyl-4H-pyrazino[2,3-d]-[1,3]oxazin-4-one

This compound is prepared by essentially the same method described in Example 1, Step C, except that the 3-amino-6-chloropyrazinoic acid of Example 1, Step C, is replaced by an equimolecular quantity of 3-amino-6-phenyl-pyrazinoic acid.

Example 11.—6 - chloro - 4H - pyrazino[2,3 - d][1,3] oxazin-4-one

This compound is prepared by essentially the same method as described in Example 1, Step C, except that the acetic anhydride of Example 1, Step C, is replaced by an equivalent quantity of a mixture of formic acid and acetic anhydride (1:1 by volume).

Example 12.—2 - methyl - 6 - dimethylamino - 4H-pyrazino-[2,3-d][1,3]oxazin-4-one Step A: Preparation of N-methyl-3-amino-6-chloro-pyrazinamide.—Methyl 3-amino-6-chloropyrazinoate (20 g., 0.107 mole) is suspended in aqueous 40% methyl-amine (200 ml.) and the mixture is stirred vigorously for 20 hours at room temperature. The reaction mixture is filtered and the solid is washed with water and dried. The yield is 17.5 g. (87%), M.P. 151.5–154.5° C. The product is crystallized from ethanol, M.P. 152.5–154.5° C.

*Analysis.*—Calculated for $C_6H_7N_4OCl$: C, 38.62; H, 3.78; N, 30.03. Found: C, 38.62; N, 3.82; N, 29.71.

Step B: Preparation of 3 - methyl - 6 - chloro-4(3H)-pteridinone.—To a mixture of triethylorthoformate (20 ml.) and acetic anhydride (20 ml.) is added N-methyl-3-amino-6-chloropyrazinamide (3 g., 0.016 mole) and the resulting solution is refluxed for two hours. The reaction mixture is cooled, and the product that separates is removed by filtration, washed with ethyl acetate and dried. The yield is 2.6 g. (82%), M.P. 216.5–219.5° C. The product is crystallized from methanol, M.P. 217.5–219.5° C.

*Analysis.*—Calculated for $C_7H_5N_4OCl$: C, 42.76; H, 2.56; N, 28.50. Found: C, 42.85; H, 2.79; N, 28.17.

Step C: Preparation of 3-methyl-6-dimethylamino-4(3H)-pteridinone.—To a solution of 25% aqueous dimethylamine (5.0 ml.) in 2-methoxyethanol (40 ml.) is added 3 - methyl-6-chloro - 4(3H)-pteridinone (4.0 g., 0.0205 mole), and the resulting solution is heated for 2.5 hours on the steam bath. The reaction mixture is then cooled in an ice bath, whereupon a solid separates. This product is separated by filtration, washed with cold methanol and dried. The yield is 3.0 g. (72%), M.P. 251–256° C. The product is crystallized from methanol, M.P. 256–258° C.

*Analysis.*—Calculated for $C_9H_{11}N_5O$: C, 52.67; H, 5.40; N, 34.13. Found: C, 52.99; H, 5.39; N, 34.19.

Step D: Preparation of 3-amino-6-dimethylamino-pyrazinoic acid.—Sodium hydroxide (15 ml. of 10%) and 3-methyl-6-dimethylamino-4(3H)-pteridinone (1.0 g., 0.0049 mole) are mixed and then heated, with stirring, for 2.5 hours on the steam bath. The reaction is cooled to room temperature and then carefully neutralized with formic acid. The product separates and is recovered by filtration and air dried. The yield is 0.7 g. (79%), M.P. 160.5–165.5° C. (dec.). The analytical sample is crystallized from methanol, M.P. 164.5–165.5° C. (dec.).

*Analysis.*—Calculated for $C_7H_{10}N_4O_2$: C, 46.15; H, 5.53; N, 30.76. Found: C, 46.32; H, 5.71; N, 30.68.

Step E: Preparation of 2-methyl-6-dimethylamino-4H-pyrazino - [2,3-d][1,3]oxazin-4 - one.—A mixture of 3-amino-6-dimethylaminopyrazinoic acid (2.0 g., 0.011 mole) and acetic anhydride (25 ml.) is stirred and heated for 2.5 hours on the steam bath. The resulting solution is chilled in an ice bath whereupon a solid separates. This product is separated by filtration, washed with cold ether and dried. The yield is 1.5 g. (66%), M.P. 212° C. (dec.). The melting point remains unchanged after recrystallization of the product from benzene.

*Analysis.*—Calculated for $C_9H_{10}N_4O_2$: C, 52.42; H, 4.89; N, 27.17. Found: C, 52.89; H, 5.12; N, 27.04.

By replacing the 3-methyl-6-chloro-4(3H)-pteridinone used in Step C of Example 12 by an equimolecular quantity of 6-chloro-4(3H)-pteridinone (from Example 4, Step B) and then following substantially the same procedure described in Step C of Example 12, there is obtained a 75% yield of 6-dimethylamino-4(3H)-pteridinone which, after recrystallization from aqueous isopropyl alcohol, melts at 294–296° C.

*Analysis.*—Calculated for $C_8H_9N_5O$: C, 50.25; H, 4.74; N, 36.63. Found: C, 50.56; H, 4.91; N, 36.72.

By replacing the dimethylamine used in Step C of Example 12, by 5.0 ml. of a 25% aqueous solution of piperidine, isopropylamine and benzylamine and following substantially the same procedure described in Step C of Example 12, there is obtained, respectively:

3 - methyl - 6 - piperidino - 4(3H) - pteridinone, M.P. 207–209° C.

3-methyl-6-isopropylamino-4(3H)-pteridinone (as sodium salt) and 3-methyl-6-benzylamino-4(3H)-pteridinone, M.P. 212–214° C.

Each of the above products is hydrolyzed to its corresponding pyrazinoic acid by the procedure described in Example 12, Step D, and each then is converted to its pyrazino[2,3-d][1,3]oxazin-4-one by the process described in Step E of Example 12, yielding, respectively:

2-methyl-6-piperidino-4H-pyrazino[2,3-d][1,3]oxazin-4-one, M.P. 172–174° C., 2-methyl-6-isopropylamino-4H-pyrazino[2,3-d][1,3]-oxazin-4-one, M.P. 212–214° C., and 2-methyl-6-benzylamino-4H-pyrazino[2,3-d][1,3]-
oxazin-4-one, M.P. 168–170° C.

Example 13.—(3-acetamido-6-dimethylaminopyrazinoyl)-
guanidine nitrate

Sodium metal (0.5 g., 0.0217 mole) is dissolved in methanol (30 ml.), and guanidine hydrochloride (2.0 g., 0.021 mole) is added to the resulting solution. To this solution is added 2-methyl-6-dimethylamino-4H-pyrazino-[2,3-d][1,3]oxazin-4-one (1.0 g., 0.0048 mole) and the reaction mixture is stirred at room temperature for 3 hours. The solvent is removed by evaporation and then water (50 ml.) is added. A yellow solid separates which is separated by filtration. The moist solid is suspended in water and dissolved by the addition of several drops of acetic acid. The clear solution is filtered, cooled in an ice bath and then several drops of nitric acid is added. After a short time the red nitrate salt crystallizes. This material is separated by filtration and dried. The yield is 0.7 g. (44%), M.P. 236.5° C. (dec.). Recrystallization from water gives material with the same melting point.

Analysis.—Calculated for $C_{10}H_{16}N_8O_5$: C, 36.59; H, 4.91; N, 34.13. Found: C, 36.53; H, 5.02; N, 34.27.

By replacing the oxazine used in Example 13 by equimolecular quantities of 2-methyl-6-chloro-7-amino-4H-pyrazino[2,3-d][1,3]-
oxazin-4-one,
2-methyl-6-chloro-7-dimethylamino-4H-pyrazino-
[2,3-d][1,3]oxazin-4-one and
2-methyl-6-chloro-7-isopropylamino-4H-pyrazino-
[2,3-d][1,3]oxazin-4-one, and then following substantially the same procedure described in Example 13, there is obtained, respectively:

(3-acetamido-5-amino-6-chloropyrazinoyl)guanidine
nitrate,
(3-acetamido-5-dimethylamino-6-chloropyrazinoyl)-
guanidine nitrate and
(3-acetamido-5-isopropylamino-6-chloropyrazinoyl)-
guanidine nitrate.

Example 14.—(3-amino-6-dimethylaminopyrazinoyl)
guanidine

A solution of (3-acetamido-6-dimethylaminopyrazinoyl)guanidine nitrate (0.5 g., 0.0015 mole) in 10% hydrochloric acid (10 ml.) is heated on the steam bath for 10 minutes. The solution is then cooled and carefully neutralized with sodium hydroxides. The orange solid that separates is collected on a funnel, washed with cold water and then dried. The yield is 0.25 g., (73%), M.P. 196.5° C. (dec.). For analysis a sample is dissolved in acetic acid, reprecipitated with sodium hydroxide, and the melting point is unchanged.

Analysis.—Calculated for $C_8H_{13}N_7O$: C, 43.04; H, 5.87; N, 43.92. Found: C, 42.80; H, 6.00; N, 43.94.

By replacing the (3-acetamido-6-dimethylaminopyrazinoyl)guanidine nitrate used in Example 14 by equimolecular quantities of (3-acetamido-5-amino-6-chloropyrazinoyl)guanidine
nitrate,
(3-acetamido-5-dimethylamino-6-chloropyrazinoyl)
guanidine nitrate and
(3-acetamido-5-isopropylamino-6-chloropyrazinoyl)-
guanidine nitrate and following substantially the same procedure described in Example 14, there is obtained, respectively:

(3,5-diamino-6-chloropyrazinoyl)guanidine, M.P. 240.5–241.5° C.
(3-amino-5-dimethylamino-6-chloropyrazinoyl)guanidine, M.P. 216–217° C., and
(3-amino-5-isopropylamino-6-chloropyrazinoyl)
guanidine, M.P. 215° C.

Example 15.—(3-acetamido-6-methylmercaptopyra-
zinoyl)guanidine

Guanidine hydrochloride (5.0 g., 0.052 mole) is added to a solution of 1.0 g. (0.043 g. atom) of sodium in 30 ml. of 2-propanol. 2-methyl-6-methylmercapto-4H-pyrazino[2,3-d][1,3]oxazin-4-one (2.1 g., 0.01 mole) from Example 4, Step E, is added and the mixture is stirred for 1.5 hours at room temperature. The mixture is then poured into 100 ml. of water and the product that precipitates is removed by filtration. The product is dissolved in dilute hydrochloric acid and then reprecipitated by addition of dilute sodium hydroxide yielding 68% of (3-acetamido-6 - methylmercaptopyrazinoyl)guanidine, M.P. 220–222° C.

Analysis.—Calculated for $C_9H_{12}N_6O_2S$: C, 40.29; H, 4.51; N, 31.33. Found: C, 39.90; H, 4.39; N, 31.39.

Example 16.—(3-amino-6-methylmercaptopyrazinoyl)
guanidine (3-acetamido-6 - methylmercaptopyrazinoyl)guanidine, from Example 15, is added to water and the mixture acidified with hydrochloric acid to dissolve and then deacetylate the product. Upon making the solution basic with dilute sodium hydroxide, the product precipitates and is collected by filtration giving an 86% yield of (3-amino-6 - methylmercaptopyrazinoyl)guanidine, M.P. 203–205° C.

Analysis.—Calculated for $C_7H_{10}N_6OS$: C, 37.16; H, 4.45; N, 37.15. Found: C, 37.43; H, 4.51; N, 37.06.

Example 17.—(3-amino-6-benzylmercaptopyrazinoyl)
guanidine

Guanidine hydrochloride (5.0 g., 0.052 mole) is added to a solution of sodium (10 g., 0.043 g. atom) in 2-propanol (30 ml.). 2-methyl-6-benzylmercapto-4H-pyrazino[2,3-d][1,3]oxazin-4-one (3.4 g., 0.012 mole) is added and the mixture allowed to stand 1 hour at room temperature. The mixture containing (3-acetamido-6-benzylmercaptopyrazinoyl)guanidine then is poured into water (100 ml.) and the mixture acidified with hydrochloric acid to dissolve and deacetylate the gummy product which precipitates. The solution is made basic to precipitate the produce which is recrystallized from aqueous 2-propanol to yield 1.1 g. of 3-amino-6-benzylmercaptopyrazinoyl) guanidine, M.P. 171–173° C. (dec.).

Analysis.—Calculated for $C_{13}H_{14}N_6OS$: C, 51.64; H, 4.67; N, 27.80. Found: C, 51.85; H, 4.82; N, 27.62.

By replacing the guanidine hydrochloride and the oxazine employed in Example 17 by equimolecular quantities of 1,2-dimethylguanidine hydriodide and 2,7-dimethyl-6-benzylsulfonyl-4H-pyrazino[2,3-d][1,3]oxazin-4-one, and following substantially the same procedures described in Example 17 there is obtained 1-(3-amino-5-methyl-6-benzylsulfonylpyrazinoyl)-2,3-dimethylguanidine.

Similarly by replacing the guaniding hydrochloride and the oxazine used in Example 17 by equimolecular quantities of (2-hydroxyethyl)guanidine sulfate and 2-methyl-6-chloro-7-amino-4H - pyrazino[2,3-d][1,3]oxazin - 4 - one (from Example 3) and following substantially the same procedure described in Example 17, there is obtained 1-(3,5-diamino-6-chloropyrazinoyl)-3 - (2 - hydroxyethyl) guanidine.

Also by replacing the guanidine hydrochloride and the oxazine employed in Example 17 by equimolecular quantities of 1,1-dimethylguanidine sulfate and 2-methyl-6-chloro-7-amino - 4H - pyrazino-[2,3-d][1,3]oxazin-4-one and following substantially the same procedure described in Example 17, there is obtained 1-(3,5-diamino-6-chloropyrazinoyl)-3,3-dimethylguanidine.

Example 18.—(3-amino-6-methylsulfonylpyrazinoyl)
guanidine

This product is prepared by essentially the same procedure described in Example 17, with the exception that an equimolecular quantity of 2-methyl-6-methylsulfonyl-4H-pyrazino[2,3-d][1,3]oxazin-4-one from Example 5 is employed in place of the oxazine used in Example 17. There is thus obtained a 27% yield of (3-amino-6-methylsulfonylpyrazinoyl)-guanidine, which after recrystallization from a mixture of 2-propanol and water melts at 224–226° C. (dec.).

*Analysis.*—Calculated for $C_7H_{10}N_6O_3S$: C, 32.55; H, 3.90; N, 32.54. Found: C, 32.82; H, 3.70; N, 32.19.

Example 19.—1-(3-acetamido-6-chloropyrazinoyl)-2,3-diphenylguanidine

A solution of 2-methyl-6-chloro-4H-pyrazino-[2,3-d]-[1,3]oxazin-4-one (6.0 g., 0.03 mole) from Example 1, Step C, in boiling ethyl acetate (80 ml.) is mixed with a solution of 1,2-diphenylguanidine (7.6 g., 0.036 mole) in boiling ethyl acetate (50 ml.), and the resulting solution is refluxed 15 minutes. The product which separates is collected and recrystallized from a 2-propanol-dimethylformamide mixture yielding 4.8 g. of 1-(3-acetamido-6-chloropyrazinoyl)-2,3-diphenylguanidine, M.P. 211–212° C. (dec.).

*Analysis.*—Calculated for $C_{20}H_{17}ClN_6O_2$: C, 58.75; H, 4.19; N, 20.56. Found: C, 58.88; H, 4.22; N, 20.49.

Example 20.—1-(3-amino-6-chloropyrazinoyl)-2,3-diphenylguanidine

A solution of 1-(3-acetamido-6-chloropyrazinoyl)-2,3-diphenylguanidine, from Example 19 (2.0 g., 0.005 mole) in 5% hydrochloric acid (15 ml.), water (5 ml.) and 2-propanol (12 ml.) is heated 10 minutes on the steam bath and then let stand 20 minutes. The solution is made basic by the addition of 5% sodium hydroxide solution and the product that precipitates is recrystallized from a 2-propanol-dimethyl-formamide mixture to yield 1.4 g. of 1-(3-amino-6-chloropyrazinoyl)-2,3-diphenylguanidine, M.P. 224–226° C.

*Analysis.*—Calculated for $C_{18}H_{15}ClN_6O$: C, 58.94; H, 4.12; N, 22.91. Found: C, 59.21; H, 4.05; N, 22.98.

Example 21.—1-(3-acetamido-6-chloropyrazinoyl)-3-benzylidene-aminoguanidine

A solution of 2-methyl-6-chloro-4H-pyrazino-[2,3-d][1,3]oxazin-4-one from Example 1, Step C, (4.0 g., 0.02 mole) in 2-propanol (100 ml.) is added to a solution of benzylideneaminoguanidine (3.6 g., 0.022 mole) in 2-propanol (25 ml.). The mixture is refluxed 10 minutes and then let cool to room temperature during 40 minutes. The product that precipitates is recrystallized from dimethyl sulfoxide to yield 1.8 g. of 1-(3-acetamido-6-chloropyrazinoyl) - 3 - benzylideneaminoguanidine, M.P. 235.5° C. (dec.).

*Analysis.*—Calculated for $C_{15}H_{14}ClN_7O_2$: C, 50.07; H, 3.92; N, 27.26. Found: C, 49.82; H, 3.99; N, 27.40.

Example 22.—1-(3-amino-6-chloropyrazinoyl)-3-benzylideneaminoguanidine

A solution of 1-(3-acetamido-6-chloropyrazinoyl)-3-benzylideneaminoguanidine from Example 21, (7.8 g., 0.022 mole) 5% hydrochloric acid (50 ml.) and water (25 ml.) is heated 5 minutes on the steam bath, and then chilled to cause the hydrochloride salt of the product to precipitate. The salt is dissolved in hot aqueous 2-propanol and the solution made basic by the addition of 5% sodium hydroxide solution to precipitate the product which is recrystallized from a 2-propanol-dimethylformamide mixture to yield 2.2 g., of 1-(3-amino-6-chloropyrazinoyl)-3-benzylideneaminoguanidine, M.P. 245–246° C. Further recrystallization from the same solvent mixture raises the melting point to 247–248° C.

*Analysis.*—Calculated for $C_{13}H_{12}ClN_7O$: C, 49.13; H, 3.81; N, 30.86. Found: C, 49.29; H, 3.76; N, 30.64.

Example 23.—1-(3-acetamido-6-chloropyrazinoyl)-3-acetylguanidine

Acetylguanidine (10.1 g., 0.1 mole) is added to a refluxing solution of 2-methyl-6-chloro-4H-pyrazino[2,3-d]-[1,3]oxazin-4-one, from Example 1, Step C, (14.9 g., 0.75 mole) in ethyl acetate (250 ml.) and refluxing continued for an additional 5 minutes. The product that precipitates is recrystallized from a 2-propanol-dimethylformamide mixture to yield 5.3 g. of 1-(3-acetamido-6-chloropyrazinoyl) - 3 - acetylguanidine, M.P. 194.5–196.0° C.

*Analysis.*—Calculated for $C_{10}H_{11}ClN_6O_3$: C, 40.21; H, 3.71; N, 28.14. Found: C, 40.28; H, 3.60; N, 28.03.

Example 24.—(3,5-diamino-6-chloropyrazinoyl) guanidine hydrochloride

Sodium (1.15 g., 0.050 mole) is dissolved in anhydrous methanol (25 ml.) and finely ground guanidine hydrochloride (5.25 g., 0.055 mole) is added. The mixture is stirred at room temperature for 30 minutes and then filtered, under nitrogen, through a sintered-glass funnel to remove the sodium chloride. The filtrate is concentrated to a paste under reduced pressure, using a rotatory evaporator and a 40° C. water bath, and the residual guanidine base then treated with finely ground 2-propyl - 6 - chloro-7-butyramido-4H-pyrazino[2,3-d] [1,3]oxazin-4-one (3.11 g., 0.01 mole). The mixture is heated on a steam bath for two minutes with stirring to convert the gum to a semi-solid and then allowed to stand 1 hour at room temperature. The reaction mixture is treated with water (30 ml.) and then 6 N hydrochloric acid is added until supernatant tests acid to Congo Red paper. The mixture is heated on a steam bath for 15 minutes with stirring and then filtered through a sintered-glass funnel to remove some insoluble material. The hot filtrate is treated with concentrated hydrochloric acid (3 ml.) and then chilled in an ice bath and the resulting orange solid collected and air dried, yielding 1.83 g. (69%) of product, M.P. 276.5–277.5° C. The crude product is dissolved in hot water (36 ml.), treated with charcoal and filtered and the hot filtrate treated with concentrated hydrochloric acid (0.4 ml.) and then chilled in an ice bath. After collecting and drying, there is obtained 1.65 g. of yellow solids (3,5-diamino-6-chloropyrazinoyl)guanidine hydrochloride, M.P. 293.5° C.

Example 25.—(3-acetamido-6-chloropyrazinamido) guanidine

Step A: Preparation of aminoguanidine hydrochloride.—Aminoguanidine bicarbonate (275 g., 2 mole) is suspended in 1500 ml. of water in a 5 liter, 3-necked flask fitted with a mechanical stirrer. The mixture is stirred rapidly and heated to 50–60° C. on a steam bath. The heat source is removed, rapid stirring is maintained and a slow stream of 12.2 N hydrochloric acid is added over 30 minutes. When all the acid has been added (300 ml., 3.66 mole) the solution is brought to boiling and the solvent removed by distillation. The last traces of water are removed by reduced pressure distillation (water aspirator) to give a white solid. This material is recrystallized from 4 liters of absolute ethanol, and dried in the air at room temperature, yielding 211 g. (95%) of aminoguanidine hydrochloride, M.P. 160–162° C.

Larger runs can be made using a mush consisting of aminoguanidine bicarbonate (500 g., 3.64 mole) and water (200 ml.). Hydrochloric acid (37–38%) (about 330 ml., 4 mole) is added with stirring until the solution is acidic. Since the reaction is endothermic, the application of heat is necessary. The work-up is the same as described above.

Step B: Preparation of (3-acetamido-6-chloropyrazinamido)guanidine.—Sodium metal (1 g., 0.044 mole) is dissolved in 25 ml. of boiling ethyl alcohol and added to a solution of aminoguanidine hydrochloride (5 g., 0.045 mole) in 100 ml. of ethyl alcohol. The sodium chloride which precipitates as a fine white solid is removed by filtration under anhydrous conditions.

In the meantime, 2-methyl-6-chloro-4H-pyrazino[2,3-d][1,3]oxazin-4-one (6 g., 0.03 mole) is dissolved in 125 ml. of boiling ethyl acetate. Upon mixing the two solutions, a yellow solid precipitates immediately. The mixture then is cooled to 0–5° C. and the solid filtered and washed with a little ethanol yielding 1.2 g. (44%) of (3-acetamido-6-chloropyrazinamido)guanidine, M.P. 204–205° C. (dec.).

*Analysis.*—Calculated for $C_8H_{10}ClN_7O_2$: C, 35.36; H, 3.71; N, 36.09. Found: C, 35.10; H, 4.05; N, 36.48.

By replacing the oxazine employed in Example 25, Step B, by an equimolecular quantity of 2-propyl-6-chloro-7-butyramido-4H-pyrazino-[2,3-d][1,3]oxazin - 4 - one and following substantially the same procedure described in Step B of Example 25, there is obtained (3,5-dibutyramido-6-chloropyrazinamido)guanidine.

Example 26.—(3-amino-6-chloropyrazinamido) guanidine hydrochloride

The (3-acetamido-6-chloropyrazinamido)guanidine is taken up in 150 ml. of 5% hydrochloric acid, and warmed on a steam bath for 15 minutes. After cooling to room temperature, the solution is made basic (to pH 12) with 10% sodium hydroxide, and finally cooled to 0° C. The yellow solid which precipitates is removed by filtration, pressed as dry as possible with a rubber dam, and, finally, dried at 100° C. for 16 hours yielding 2.0 g. (30%) of (3-amino-6-chloropyrazinamido)guanidine, M.P. 333–334° C. (dec.).

This material is thoroughly mixed with 5 ml. of 10% hydrochloric acid and cooled to 0–5° C. The solid hydrochloride is filtered, washed with cold isopropyl alcohol and, finally, recrystallized from 30 ml. of 3:7 aqueous isopropyl alcohol with simultaneous clarification with Darco to give 1.8 g. (75% conversion) of (3-amino-6-chloropyrazinamido)guanidine hydrochloride, M.P. 277–278° C. (dec.).

*Analysis.*—Calculated for $C_8H_9Cl_2N_7O$: C, 27.08; H, 3.41; N, 36.85; Cl, 26.65. Found: C, 27.22; H, 3.80; N, 36.81; Cl, 26.50.

By replacing the (3-acetamido-6-chloropyrazinamido) guanidine employed in Example 26 by (3,5-dibutyramido-6-chloropyrazinamido)guanidine and following substantially the same procedures described in Example 26, there is obtained (3,5-diamino-6-chloropyrazinamido)guanidine hydrochloride. The free base, obtained by hydrolysis of the salt with dilute aqueous sodium hydroxide melts at 281–282° C. (dec.).

While the above examples describe certain novel methods for the preparation of certain novel products of this invention, it is to be understood that the invention is not to be limited by the specific illustrative examples, but is to be understood to embrace variations and modifications thereof which fall within the scope of the foregoing discussion and the appended claims.

What is claimed is:

1. A process for producing 4H-pyrazino-[2,3-d]-[1,3]-oxazin-4-one which comprises reacting lower-alkanoic acid anhydride with 3-aminopyrazinoic acid.

2. A process which comprises reacting a 3-amino-5-R-6-$R^1$-pyrazinoic acid with an organic acid anhydride having the formula $(R^5CO)_2O$ to produce a compound having the following formula:

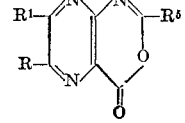

wherein
R is selected from the group consisting of hydrogen, halo, lower alkyl, cycloalkyl, phenyl, halophenyl, lower alkoxy, lower alkylthio, lower alkylsulfonyl, phenyl-lower alkylthio, phenyl-lower alkylsulfonyl, amino, lower alkylamino, (phenyl-lower alkyl)amino, di-lower alkyl amino, and

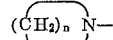

where $n$ is selected from 4 and 5;
$R^1$ is selected from the group consisting of hydrogen, halogen, lower alkyl, cycloalkyl having a 3 to 6 membered ring, phenyl, amino, lower carboxylic acylamino, mono-lower alkylamino and di-lower alkylamino;
$R^5$ is selected from the group consisting of hydrogen and alkyl.

3. The process of claim 2 wherein the alkanoic acid anhydride is acetic anhydride.

4. The process of claim 2 wherein the reaction is carried out at a temperature within the range of about 70° to 130° C.

5. A process which comprises reacting acetic anhydride with 3-amino-6-chloropyrazinoic acid to produce 2-methyl-6-chloro-4H-pyrazino[2,3-d][1,3]oxazin-4-one.

6. A process which comprises reacting acetic anhydride with 3,5-diamino-6-chloropyrazinoic acid to produce 2-methyl-6-chloro - 7 - amino - 4H - pyrazino[2,3-d][1,3]-oxazin-4-one.

7. Compounds having the formula:

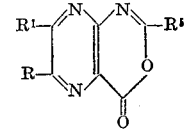

wherein
R is selected from the group consisting of hydrogen, halo, lower alkyl, cycloalkyl, phenyl, halophenyl, lower alkoxy, lower alkylthio, lower alkylsulfonyl, phenyl-lower alkylthio, phenyl-lower-alkylsulfonyl, amino, lower alkylamino, (phenyl-lower alkyl)amino, di-lower alkylamino, and

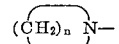

where $n$ is selected from 4 and 5;
$R^1$ is selected from the group consisting of hydrogen, halogen, lower alkyl, cycloalkyl having a 3 to 6 membered ring, phenyl, amino, lower carboxylic acylamino, mono-lower alkylamino and di-lower alkylamino;
$R^5$ is selected from the group consisting of hydrogen and alkyl.

8. 2-methyl-6-chloro-4H-pyrazino[2,3-d][1,3]-oxazin-4-one.

9. 2-methyl - 6 - chloro - 7 - amino-4H-pyrazino[2,3-d][1,3]oxazin-4-one.

10. 6,7-dichloro - 4H - pyrazino[2,3-d][1,3]oxazin-4-one.

No references cited.

HENRY R. JILES, *Primary Examiner.*

R. T. BOND, *Assistant Examiner.*